United States Patent Office 2,747,962
Patented May 29, 1956

2,747,962

REMOVAL OF OTHER ACID GASES FROM MIXTURES CONTAINING CARBON DIOXIDE

Robert G. Heitz and Albert L. Rocklin, Concord, Calif., assignors to The Dow Chemical Company, Midland, Mich., a corporation of Delaware No Drawing. Application May 14, 1953,
Serial No. 355,168

2 Claims. (Cl. 23—2)

This invention relates to an improved method for the separation of such acidic gases as hydrogen cyanide, hydrogen sulfide or sulfur dioxide from gaseous mixtures containing carbon dioxide.

It is often desired to remove such gases as those named above from gas mixtures which contain carbon dioxide, so as to effect maximum separation of the desired compound from carbon dioxide or carbonates. It appears to be customary to bring the mixture of acidic gases into prolonged and intimate contact with water or an alkaline liquid and to liberate one of the gases preferentially from the resulting solution by controlled heating or by a chemical reaction which releases one but not the other dissolved gas.

It is an object of this invention to provide a method whereby other acid gases may be removed preferentially from a gas stream containing carbon dioxide. It is a specific object to provide such a method whereby hydrogen cyanide may be removed from its gaseous mixtures with carbon dioxide. Another object is to provide such a method whereby hydrogen sulfide can be removed from its gaseous mixtures with carbon dioxide.

The method of the invention, whereby the foregoing objects are realized, consists in bringing the gas mixture containing carbon dioxide and another acid gas into contact with the surface of an alkaline liquid under conditions such that the gas phase is in contact with the alkaline liquid phase for a period of not to exceed 0.3 second. It is preferred that the contact between the gas and liquid be limited to 0.05 second or less. When the period of contact exceeds 0.3 second, absorption is not sufficiently selective to give the desired separation of the acidic constituents of the gas.

The gas-liquid contact may be obtained in any of several ways as long as the recognized principles of efficient gas absorption are observed. Thus, the gas may be fed through a cylinder down whose walls is flowing a film of the alkaline liquid, or the gas may be blown upward through a sieve plate which is kept wet with the alkaline liquid, or the alkaline liquid may be fed axially to the throat of a venturi tube while the gas is supplied to the same point about the periphery of the liquid stream.

In these and other ways of effecting the gas-liquid contact, the velocity of the gas mixture must be such that, in the apparatus employed, there will be not over 0.3 second contact between the rapidly moving gas and the more slowly moving liquid. In some absorbers, there may be intermittent contact between the acid gases and alkaline absorbent. The aggregate contact time should be not over 0.3 second.

The alkaline liquid may be an alkali metal hydroxide solution, or an alkali metal phosphate solution, or an alkanolamine, or an amine solution, or any other alkaline liquid. It is preferred that the alkaline liquid be one which does not form an insoluble precipitate in contact with the constituents of the gas mixture. The alkaline solution should contain enough of the absorbing compound to permit the amount of acid gas which will be brought in contact with it to be absorbed.

The operating temperature of the process is any temperature above the freezing point of the alkaline liquid but temperatures much above atmospheric favor a disproportionately high absorption of carbon dioxide even at the short contact times employed in the present process and should be avoided. It is preferred to operate at or near room temperature.

The following Table I illustrates the effect of gas-liquid contact time on the separation ratio when hydrogen sulfide is being absorbed in aqueous sodium hydroxide from a mixture of hydrogen sulfide, carbon dioxide and air. The gas and a liquid film of sodium hydroxide solution flowed concurrent at known rates down a tube of measured length and diameter. The exit gas was analyzed, as was the alkaline solution. In all cases the gas flow was 20 liters per minute, and the feed gas was 90 per cent air and 5 per cent each of hydrogen sulfide and carbon dioxide and was at one atmosphere pressure.

In all tables herein the term "separation ratio" refers to the ratio of the mol per cent of the gases absorbed.

*Table I*

| Absorption Tube | | Sodium Hydroxide Solution | | Gas contact time, seconds | Percent of acid gases absorbed | | Separation Ratio $H_2S/CO_2$ |
|---|---|---|---|---|---|---|---|
| Internal Diameter, mm. | Length, inches | Normality | Flow, ml. per minute | | $H_2S$ | $CO_2$ | |
| 10 | 48 | 1.0 | 189 | 0.29 | 85.6 | 17.0 | 5.04 |
| 5 | 48 | 1.0 | 189 | 0.072 | 95.8 | 17.5 | 5.47 |
| 5 | 24 | 1.0 | 185 | 0.036 | 95.5 | 11.9 | 8.02 |
| 5 | 12 | 1.0 | 187 | 0.018 | 91.0 | 7.9 | 11.5 |
| 3.7 | 24 | 10.0 | 10.7 | 0.020 | 94.0 | 4.4 | 20 |
| 3.7 | 24 | 8.0 | 9.7 | 0.020 | 90.8 | 4.6 | 20 |
| 3.7 | 24 | 8.0 | 8.3 | 0.020 | 89.7 | 4.2 | 21 |

Using the same gas mixture, flowing upward through a sieve tray against a film of sodium hydroxide solution, and with contact times below 0.05 second, separation ratios were obtained in the same range, indicating about 8 times as much hydrogen sulfide as carbon dioxide was absorbed.

Various alkaline liquids were used as absorbents in a series of tests carried out in a venturi absorber. The liquid and gas were mixed at the throat of the venturi tube and the two phases were separated at once in a cyclone chamber. The gas was in contact with the alkaline absorbent for, at most, about 0.02 to 0.04 second. Details of these runs on $H_2S$—$CO_2$-air and HCN—$CO_2$-air are given in Table II.

in which these are the principal acidic constituents which comprises bringing a rapidly moving stream of such a gas mixture into contact with a relatively slowly moving stream of an aqueous solution of a material from the group consisting of alkali metal hydroxide and mixtures

Table II

| Absorbent | | Flow | | Gas | | | | | Percent of acid gases absorbed | | Separation Ratio, $H_2S/CO_2$ |
|---|---|---|---|---|---|---|---|---|---|---|---|
| Kind | Molar Concentration | ml./min. | Gram mols per hour | Composition | | Flow, gm. mols per hour | | | $H_2S$ | $CO_2$ | |
| | | | | $H_2S$ Mol percent | $CO_2$ Mol percent | $H_2S$ | $CO_2$ | | | | |
| Sodium Hydroxide | 1 M | 100 | 6.0 | 5.2 | 5.2 | 2.83 | 2.77 | | 79.3 | 4.02 | 19.7 |
| Do | 1 M | 161 | 9.7 | 5.3 | 5.3 | 2.83 | 2.88 | | 90.9 | 6.0 | 15.1 |
| Diethanolamine | 0.25 M | 98 | 1.47 | 5.4 | 5.2 | 2.92 | 2.78 | | 15.1 | 1.13 | 13.4 |
| Do | 0.25 M | 200 | 3.0 | 5.6 | 5.3 | 3.0 | 2.86 | | 45.9 | 2.19 | 21.0 |
| Do | 0.25 M | 200 | 3.0 | 5.3 | 5.3 | 2.86 | 2.83 | | 52.6 | 2.08 | 25.3 |
| Do | 1.0 M | 197 | 11.8 | 5.4 | 5.4 | 2.94 | 2.91 | | 75.7 | 4.61 | 16.4 |
| Do | 4.0 M | 71.4 | 17.1 | 5.2 | 5.2 | 2.79 | 2.82 | | 55.7 | 4.78 | 11.6 |
| Do | 4.0 M | 224 | 53.8 | 5.6 | 5.4 | 3.04 | 2.92 | | 83.6 | 7.30 | 11.4 |
| Do | 4.0 M | 126 | 30.2 | 4.3 | 4.5 | 2.88 | 3.05 | | 64.3 | 4.04 | 15.9 |
| Trisodium phosphate | 0.5 M | 223 | 6.7 | 5.4 | 5.4 | 2.94 | 2.92 | | 74.0 | 6.48 | 11.4 |

| Absorbent | | Flow | | Gas | | | | | Percent of acid gases absorbed | | Separation Ratio, $HCN/CO_2$ |
|---|---|---|---|---|---|---|---|---|---|---|---|
| Kind | Molar Concentration | ml./min. | Gram mols per hour | Composition | | Flow, gm. mols per hour | | | HCN | $CO_2$ | |
| | | | | HCN Mol percent | $CO_2$ Mol percent | HCN | $CO_2$ | | | | |
| Sodium Hydroxide | 1 M | 70 | 4.2 | 5 | 5 | 2.68 | 2.68 | | 70 | 3.7 | 18.1 |
| Do | 1 M | 100 | 6.0 | 5 | 5 | 2.68 | 2.68 | | 88 | 5.6 | 15.7 |
| Do | 1 M | 100 | 6.0 | 5 | 5 | 2.68 | 2.68 | | 86 | 4.8 | 17.9 |
| Do | 1 M | 150 | 9.0 | 5 | 5 | 2.68 | 2.68 | | 89 | 6.9 | 12.9 |
| Do | 1 M | 170 | 10.2 | 5 | 5 | 2.68 | 2.68 | | 93 | 7.8 | 11.9 |
| Sodium hydroxide and Sodium cyanide | 1.57 M / 6.6 M | 100 | 9.4 / 39.6 | 5 | 4 | 2.39 | 1.95 | | 66 | 1.5 | 44.0 |
| Do | 0.125 M / 10.2 M | 300 | 2.25 / 184.0 | 5 | 5 | 2.22 | 2.25 | | 52 | about 1.0 | about 52 |

It is seen that, with a sacrifice in the degree of absorption, there may be obtained an extract which is substantially free from carbon dioxide.

The invention is not limited to the simple types of gas mixtures which have been shown in the examples, as it is effective in the separation of other acidic gases from mixtures containing carbon dioxide. Among such mixtures commonly encountered are flue gases, coke oven gases, and many gaseous mixtures produced in chemical synthesis such as the gases obtained by burning hydrocarbons and ammonia to form hydrogen cyanide.

We claim:

1. A method for effecting substantial separation of hydrogen cyanide from carbon dioxide in gas mixtures thereof with alkali metal cyanide, and maintaining said contact only for a period of less than 0.05 second.

2. The method claimed in claim 1, wherein the alkaline liquid is an aqueous solution containing sodium hydroxide, and the contact time is controlled within the range from 0.02 to 0.04 second.

References Cited in the file of this patent

UNITED STATES PATENTS

| | | |
|---|---|---|
| 1,799,177 | Perry | Apr. 7, 1931 |
| 2,083,213 | Baehr | June 8, 1937 |
| 2,161,663 | Baehr | June 6, 1939 |
| 2,419,225 | Mitchell | Apr. 22, 1947 |
| 2,614,904 | Rayer | Oct. 21, 1952 |